May 15, 1928.  
W. K. MONROE  
CLUTCH  
Filed June 29, 1927  
1,669,878  
2 Sheets-Sheet 1
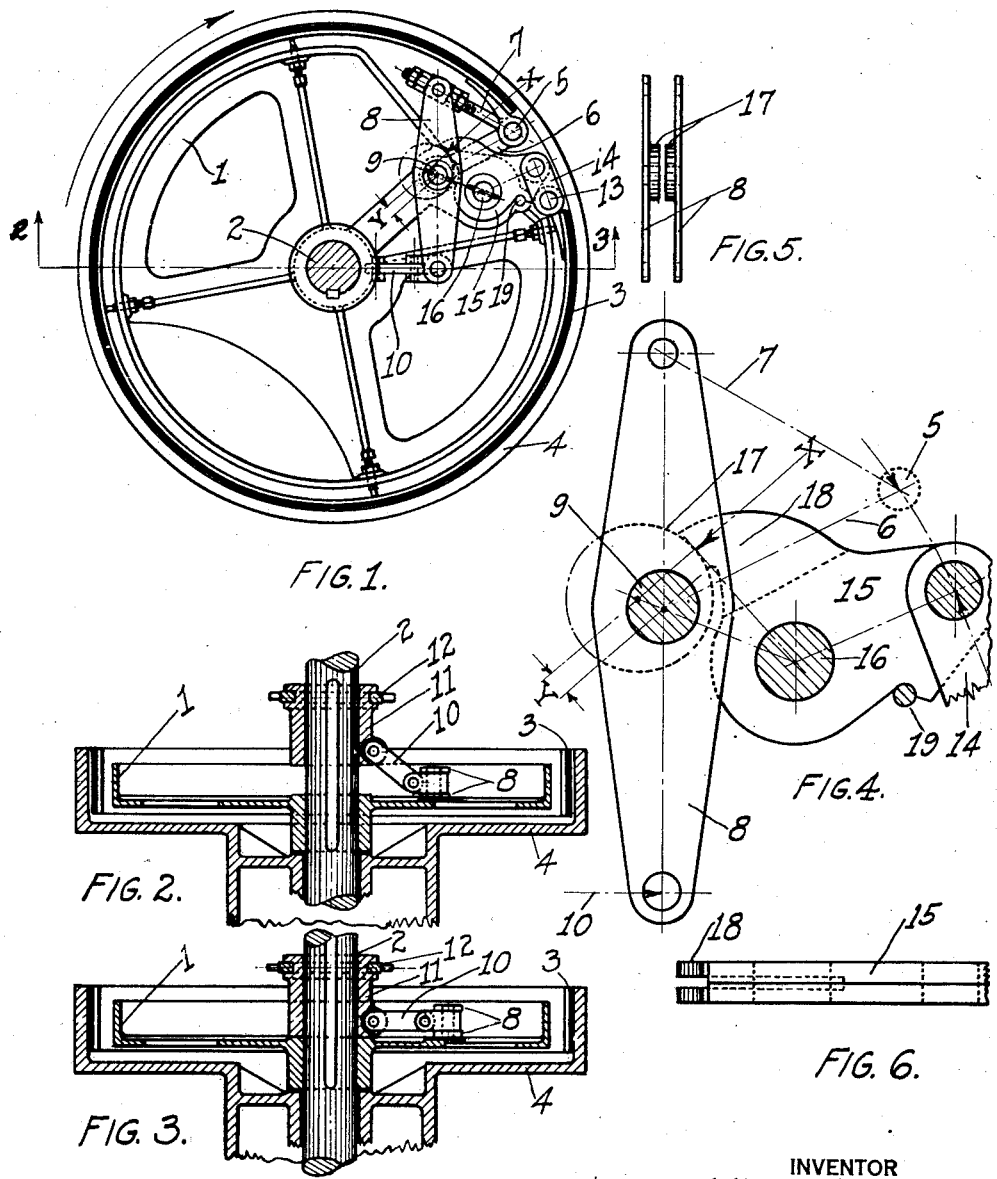

May 15, 1928.  
W. K. MONROE  
CLUTCH  
Filed June 29, 1927  
1,669,878  
2 Sheets-Sheet 2
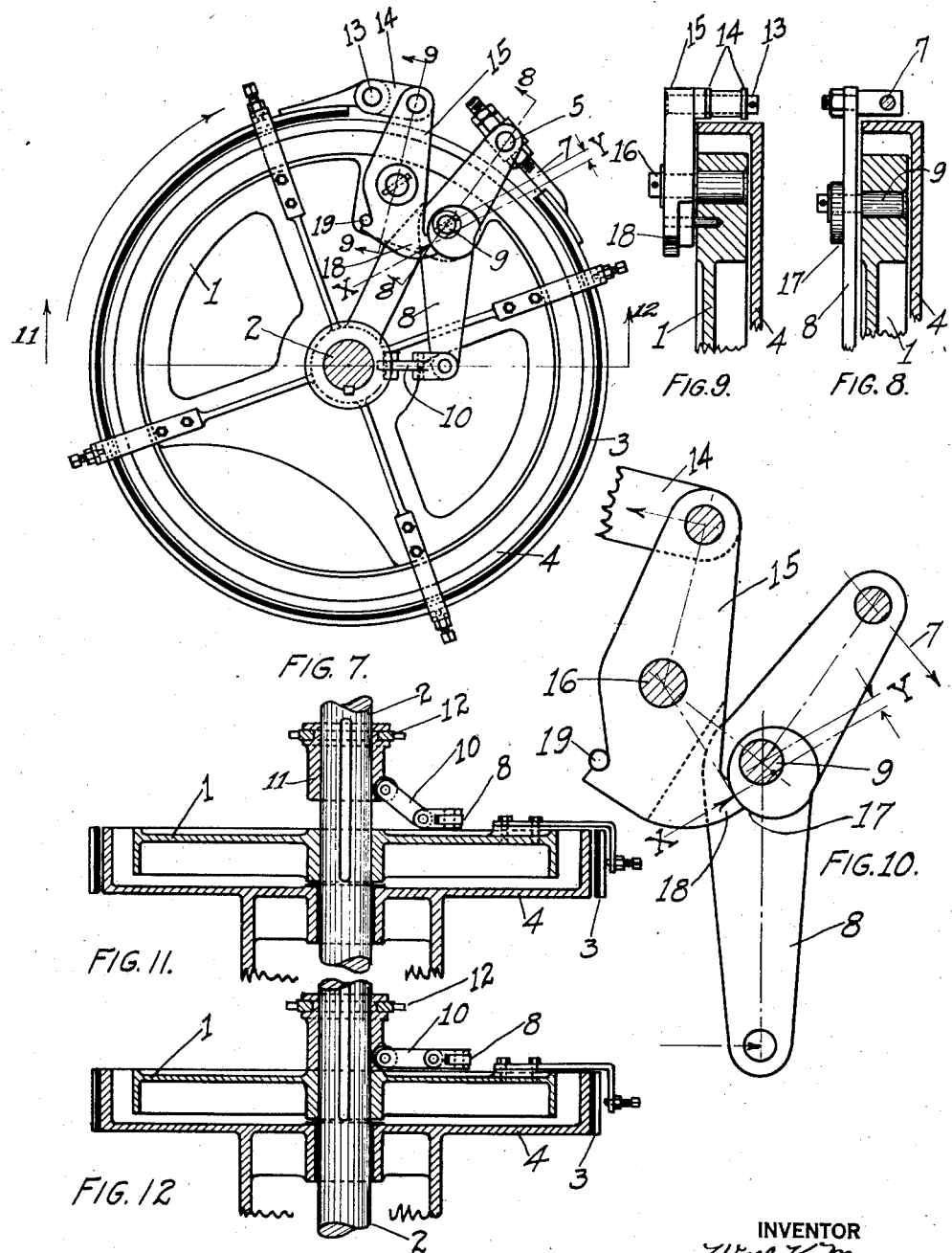

Patented May 15, 1928.

1,669,878

UNITED STATES PATENT OFFICE.

WILL K. MONROE, OF CLEVELAND, OHIO.

CLUTCH.

Application filed June 29, 1927. Serial No. 202,341.

My invention relates to clutches of the friction band type, and has for its object increased ease of operation over the ordinary type of band clutch, and confining of heavy stresses to parts of the operating mechanism attached directly to the usual spider or main driving member.

I attain these objects by means of a new construction and arrangement of the fixed or dead end anchor for the friction band, which anchor may consist of a lever or pair of levers mounted on a fulcrum pin carried by the spider or driving member, the live end of the band being attached to one end of this lever or levers and the opposite end of the band to a dead end lever or levers resting on a boss or bosses on the live end lever eccentric with the fulcrum pin thereof whereby the center through which forces transmitted by the dead end lever resting upon the boss or bosses will act, will be off center with respect to that of the fulcrum pin of the live end lever, and in a direction which will tend toward the engagement of the clutch.

In the case of the ordinary clutch the dead end is fixed to the spider or driving member and independent of the live end of the band, so that forces set up in the dead end of the band have no effect on the live end other than exerted through the band itself. It is however, a fact well known in the art that the pressure exerted on the dead end of a band clutch while being engaged and during engagement is much greater than the force required to be exerted on the live end of the band in order to set the clutch, and this fact is taken advantage of in my invention as described.

I obtain the objects mentioned by the combination of mechanical parts illustrated in the accompanying drawings, in which Fig. 1 is a side view of an internal expanding band friction clutch, disengaged; Fig. 2 is a section through the same clutch, taken along the line 2—3; Fig. 3 is a similar section through the same clutch, engaged; Fig. 4 is a diagrammatic detail of dead and live end levers showing their relation in order to produce a leverage action on the live end lever tending to set the clutch; Fig. 5 is an elevation of the live end levers appearing in Fig. 1; Fig. 6 is a plan view of the dead end levers appearing in Fig. 1; Fig. 7 is a side elevation of an external contracting band type of clutch in which my invention is embodied; Figs. 8 and 9 are details partly in section of the live and dead end levers respectively of Fig. 7, showing more clearly the arrangement of these levers and their immediately cooperating parts; Fig. 10 is a diagrammatic detail of dead and live end levers in the contracting type of clutch; and Figs. 11 and 12 are sections along the line 11—12 of Fig. 7 showing the clutch disengaged and engaged respectively.

Referring now specifically to the drawings 1 is a spider secured upon a shaft 2 which may be the primary driving member of the clutch, the spider carrying the friction band 3 adapted to cooperate with a corresponding friction surface in a driven member 4 of the clutch. In Figs. 1 to 3 the driven friction surface is arranged outside the band 3 so that expansion of the band will effect frictional engagement between the driving and driven clutch members.

The arrangement of Figs. 7, 11 and 12 is that of a contracting band type of clutch, the band lying outside the driven friction surface and therefore being adapted for contraction to engage the surface; in each case the direction of drive is that of the arcuate arrows.

Referring now particularly to the expansion type illustrated in Figs. 1 to 6 the live end 5 of the friction band is supported for movement eccentrically of the clutch by a strut member 6 and is in connection through an adjustable link 7 with a pair of live end levers 8 pivotally mounted at 9 on the spider; the opposite ends of the levers 8 being in connection as through a link 10 with a clutch sleeve 11 adapted for longitudinal movement upon the shaft 2 as by means of a shifter ring 12, all in a manner well known in the art. The arrangement is obviously such that longitudinal movement of the ring 12 will effect movement of the levers 8 relative to the spider on which they are mounted, to move the live end of the friction band 3 to expand or contract the band, its other end being fixed. The dead end 13 of the band is in fact, connected as through the links 14 with a dead end lever 15 pivotally secured upon the spider 1 at 16. The levers 8 are provided as by the bosses 17 with surfaces eccentric of the fulcrum 9 thereof; and each of the dead end levers 15 is provided with a member 18 having a surface adapted to bear upon and cooperate with one of these eccentric surfaces. The proportion and arrangement of the parts however, is such that the bearing of the members 18 is somewhat off center of the fulcrum or axis 9, of the levers 8.

The operation of my device will be as follows referring particularly to Figs. 1 to 4. By movement of the sleeve 12 from its position appearing in Fig. 2 to that of Fig. 3, a rotation of the levers 8 in counterclockwise direction relative to the rotating spider 1 will be effected. This motion is transmitted generally through the mechanism indicated to the live end of the friction band. Since the opposite or dead end of the band however, is substantially fixed with the spider the result will be an expanding of the band against the driven member 4, and hence ultimately rotation thereof with the shaft 2.

Movement of the live end of the band however, in counterclockwise direction relative to the spider will result in a tendency to move the dead end of the band in the same direction. This tendency is transmitted through the links 14 to the levers 15 resulting in a counterclockwise tendency in the levers 15 and a bearing with considerable force of the members 18 against the levers 8. The relation of the members 18 however with respect to the levers 8, as particularly indicated in Fig. 4 is such that the line of force exerted by the members 18 will be in the direction of the arrow "x" off set from the center of the fulcrum 9 by a distance "y"; obviously the ultimate result of this arrangement will be a tendency toward relative counter clockwise movement of the live end levers 8 and in assistance of the friction effecting movement of the same. A pin 19 may be secured in the spider to limit relative clockwise motion of the dead end levers.

In Figs. 7, 8, 9, 10, 11 and 12 an application of the same principle is shown but in a contracting band type of clutch. The functioning of the several parts is generally as described for the expanding type and will be obvious to any one familiar with the art.

My invention is not to be confused with the differential type of clutch wherein there is considerable movement of the dead end. In the improvements herein there is practically no movement of the dead end, as a result that there is a substantially constant leverage of the force applied along the line "x"; further the bearing between the live and dead end levers may be made according to my construction of ample area, and owing to the slight relative movement of these bearing areas practically a full surface contact is maintained throughout the clutch operation. This is particularly important in the case of heavy duty clutches where large forces and rapid and continuous operation must be accommodated for by the levers.

What I claim is:

1. In a clutch, a friction band, a live end lever in connection with one end of said band and adapted for primary control of the same, said lever having a surface eccentric of the fulcrum thereof, and a dead end lever in connection with the opposite end of said band, a member of said dead end lever bearing against said surface and adapted upon tightening of said band by movement of said live end lever to direct a force from said band against said surface in aid of said live end lever movement.

2. In a clutch, a friction band, a live end lever in connection with one end of said band and adapted for primary control of the same, said lever having a surface eccentric of the fulcrum thereof, a dead end lever in connection with the opposite end of said band, a member of said dead end lever being adapted to cooperate with said surface whereby upon tightening of said band by movement of said live end lever, a force from said band is exerted with substantially constant leverage upon said live end lever in aid of said movement thereof.

3. In a clutch, a friction band, a live end lever in connection with one end of said band and adapted for primary control of the same, said lever having a surface eccentric of the fulcrum thereof, a dead end lever in connection with the opposite end of said band, a member of said dead end lever being adapted to bear against said surface, and upon tightening of said band by movement of said live end lever, to exert a force from said band against said surface in a direction non-radial of said fulcrum and in aid of said movement.

4. In a clutch, a friction band, a live end lever in connection with one end of said band and adapted for primary control of the same, on said lever having a cylindrical surface eccentric of the fulcrum thereof, a dead end lever in connection with the opposite end of said band, a member of said dead end lever being adapted to bear against said surface, and, upon tightening of said band by movement of said live end lever, to exert a force from said band against said surface in a direction normal to said surface, and in aid of said movement.

5. In a clutch, a friction band, a live end lever in connection with one end of said band and adapted for primary control of the same, said lever having a surface eccentric of the fulcrum thereof, a dead end lever in connection with the opposite end of said band, a member of said dead end lever being adapted to bear throughout a substantial area against said surface, and upon tightening of said band by movement of said live end lever, exert a force from said band against said surface, in a direction non-radial of said fulcrum and in aid of said movement.

6. In a clutch, a friction band, a live end lever in connection with one end of said band and adapted for primary control of the same, said lever having a cylindrical surface eccentric of the fulcrum thereof, a dead end lever in connection with the opposite end of said band, a member of said dead end lever being adapted to bear with substantial area against said surface, and, upon tightening of said band by movement of said live end lever, exert a force from said band against said surface in a direction normal to said surface, and in aid of said movement.

7. In a clutch, a friction band, a live end lever in connection with one end of said band and adapted for primary control of the same, said lever having a cylindrical surface eccentric of the fulcrum thereof, a dead end lever in connection with the opposite end of said band, a member of said dead end lever being adapted to bear against said surface, and, upon tightening of said band by movement of said live end lever, to exert a force from said band against said surface in a direction normal to said surface and non radial of said fulcrum and in aid of said movement.

8. In a clutch, a friction band, a live end lever in connection with one end of said band and adapted for primary control of the same, said lever having a cylindrical surface eccentric of the fulcrum thereof, a dead end lever in connection with the opposite end of said band, a member of said dead end lever being adapted to bear with substantial area against said surface, and, upon tightening of said band by movement of said live end lever, exert a force from said band against said surface in a direction normal to said surface, and non-radial of said fulcrum, and in aid of said movement.

In testimony whereof I hereby affix my signature.

WILL K. MONROE.